US008153192B2

(12) United States Patent
Masutani et al.

(10) Patent No.: US 8,153,192 B2
(45) Date of Patent: Apr. 10, 2012

(54) METHOD OF FORMING A COMPOSITE

(75) Inventors: Akira Masutani, Kernen (DE); Akio Yasuda, Stuttgart (DE); Anthony Roberts, Brandon (GB); Marek Szablewski, Durham (GB); David Bloor, Durham (GB); Graham Cross, Bishopton (GB)

(73) Assignee: Sony Deutschland GmbH, Cologne (DE)

( * ) Notice: Subject to any disclaimer, the term of this patent is extended or adjusted under 35 U.S.C. 154(b) by 1014 days.

(21) Appl. No.: 10/498,169

(22) PCT Filed: Dec. 13, 2002

(86) PCT No.: PCT/EP02/14259
§ 371 (c)(1),
(2), (4) Date: Jun. 9, 2004

(87) PCT Pub. No.: WO03/050203
PCT Pub. Date: Jun. 19, 2003

(65) Prior Publication Data
US 2005/0079663 A1  Apr. 14, 2005

(30) Foreign Application Priority Data
Dec. 13, 2001 (EP) .................................... 01129709

(51) Int. Cl.
*B05D 5/06* (2006.01)
(52) U.S. Cl. ........................................ 427/162; 427/164
(58) Field of Classification Search .................. 427/162, 427/164
See application file for complete search history.

(56) References Cited

U.S. PATENT DOCUMENTS

| 4,944,895 | A | * | 7/1990 | Buckley et al. .......... 252/299.01 |
| 5,473,448 | A | * | 12/1995 | Yoshinaga et al. .............. 349/89 |
| 5,585,947 | A | | 12/1996 | Havens et al. |
| 5,667,720 | A | | 9/1997 | Onishi et al. |
| 6,106,743 | A | * | 8/2000 | Fan .................................. 252/582 |
| 2001/0016238 | A1 | * | 8/2001 | Coates et al. ................... 428/1.1 |

FOREIGN PATENT DOCUMENTS

| EP | 0 575 791 | 12/1993 |
| EP | 0 590 376 | 4/1994 |
| JP | 3-59515 | 3/1991 |
| JP | 4-277717 | 10/1992 |
| JP | 5-224180 | 9/1993 |
| JP | 6-265859 | 9/1994 |
| WO | WO 96/13561 | 5/1996 |
| WO | WO 96/19547 | 6/1996 |
| WO | WO 96/20986 | 7/1996 |

OTHER PUBLICATIONS

Aliev et al. (Use of porous galss-liquid crystal heterogeneous system for information display devices, 1983, pp. 1168-1171. Translated from Inzhenerno-Fizicheskii Zhurnal, vol. 43, No. 4, Oct. 1982.).*
Office Action issued May 24, 2011 in Japanese Patent Application No. 2003-551225 (with English translation).
Office Action issued May 31, 2011 in Japanese Patent Application No. 2003-551225 (with English translation).

* cited by examiner

*Primary Examiner* — Nadine Norton
*Assistant Examiner* — Mahmoud Dahimene
(74) *Attorney, Agent, or Firm* — Oblon, Spivak, McClelland, Maier & Neustadt, L.L.P.

(57) ABSTRACT

The invention relates to a method of forming a composite, to composites and devices produced by said method, and to uses thereof.

6 Claims, 6 Drawing Sheets

METHOD OF FORMING A COMPOSITE

Figure 1:
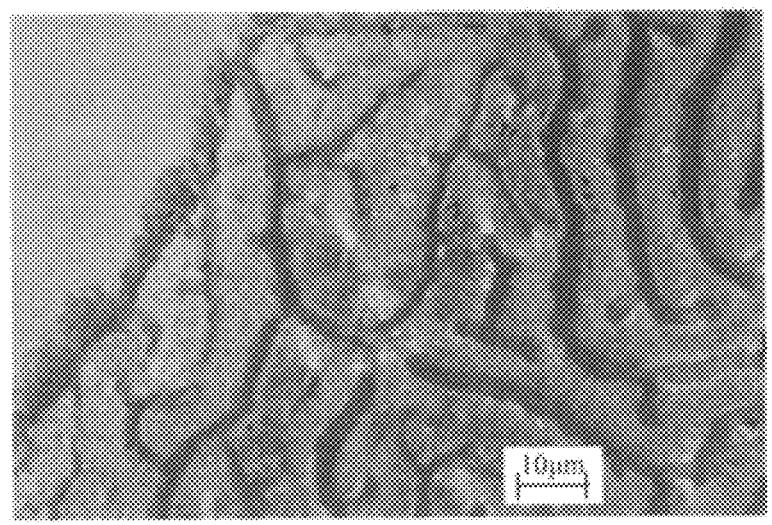

The present invention relates to a method of forming a composite containing a matrix component and at least one liquid crystal component. It also relates to a composite obtainable thereby, and to uses thereof.

Ever since it was first demonstrated, in 1976, that it was possible to change a liquid crystal composite from an opaque to a transparent state, a tremendous amount of research effort has been invested to achieve progress and to adapt this phenomenon for use in electronic components etc. The principle of changing a liquid crystal from an opaque to a transparent state was applied to a porous polymer matrix (Craighead et al., 1982, Appl. Phys. Lett. 40, 22), which was filled with a liquid crystal. The idea of encompassing a liquid crystal within a matrix, which in Craighead's experiments shorted a poor performance, was further developed in 1985 by Fergason (1985, SID Int. Symp. Digest of Tech. Papers, 16, 68) and Drzaic, (1986, J. Appl. Phys., 60, 2142) who reported liquid crystal-polymer composites obtained by drying an emulsion of liquid crystal in an aqueous solution of polyvinyl alcohol. These materials were termed "nematic curvilinear aligned phase" (NCAP) which found use in smart window applications. In NCAP applications the liquid crystal is encapsulated by standard microencapsulation or emulsification techniques which suspend it in a solid polymer film.

Another technique which was developed on the basis of Craighead's idea to embed the liquid crystal in a polymer matrix, is the so called PDLC-technique (polymer-dispersed liquid crystal). This is achieved by preparing a homogeneous mixture of a liquid crystal and a pre-polymer and thereafter inducing a phase separation by causing the pre-polymer to form a solid network, thereby inducing the liquid crystal form droplets embedded in the polymer network.

Various techniques have been developed to achieve such formation of a polymer network which are used depending on the individual circumstances. For example, when a pre-polymer material is miscible with a liquid crystal compound a phase separation by polymerization is used. This technique is referred to as polymerization-induced phase separation (PIPS). A homogeneous solution is made by mixing the prepolymer with the liquid crystal. Thereafter a polymerization is achieved through a condensation reaction, as with epoxy resins, or through a free radical polymerization, as with vinyl monomer catalyzed with a free radical initiator such as benzoyl peroxide, or by a photo-initiated polymerization. Upon polymerization the solubility of the liquid crystal decreases in the lengthening polymers until the liquid crystal forms droplets or an interconnected liquid crystal network within a growing polymer network. When the polymer starts to gel it will lock the growing droplets or the interconnected liquid crystal network thereby arresting them/it in their/its state at that time. The droplet size and the morphology of droplets or the dimensions of the liquid crystal network are determined during the time between the droplet nucleation/initiation of network formation and the gelling of the polymer. Important factors are the rate of polymerization, the relative concentrations of materials, the temperature, the types of liquid crystal and polymers used and various other physical parameters, such as viscosity, solubility of the liquid crystal in the polymer. Reasonably uniform size droplets can be achieved by this technique. Sizes prepared in the past have ranged from 0.01 µm-30 µm. Polymerisation induced phase separation (PIPS) is a preferred method for forming PDLC films. The process begins with a homogeneous mixture of liquid crystal and monomer or pre-polymer. Polymerisation is initiated to induce phase separation. Droplet size and morphology are determined by the rate and the duration of polymerisation, the types of liquid crystal and polymers and their proportions in the mixture, viscosity, rate of diffusion, temperature and solubility of the liquid crystal in the polymer (West, J. L., *Phase-separation of liquid-crystals in polymer*. Molecular Crystals and Liquid Crystals, 1988. 157: p. 427-441, Golemme, A., Zumer, S., Doane, J. W., and Neubert, M. E., *Deuterium nmr of polymer dispersed liquid crystals*. Physical Review a, 1988. 37(2): p. 599-569, Smith, G. W. and Vaz, N. A., *The relationship between formation kinetics and microdroplet size of epoxy based polymer-dispersed liquid-crystals*. Liquid Crystals, 1988. 3(5): p. 543-571, Vaz, N. A. and Montgomery, G. P., Refractive-indexes of polymer-dispersed liquid-crystal film materials—epoxy based system. Journal Of Applied Physics, 1987. 62(8): p 3161-3172). In ultraviolet light (UV) initiated polymerisation, the rate of curing may be changed by changing the light intensity (Whitehead Jr, J. B., Gill, N. L., and Adams, C., *Characterization of the phase separation of the E7 liquid crystal component mixtures in a thiol-ene based polymer*. Proc. SPIE, 2000. 4107: p. 189). The PIPS method using free-radical polymerisation is by far the most, studied, and the majority of free-radical polymerisation systems are initiated by UV light. The process has several advantages over other methods such as, better phase separation, uniform droplet size, and better control of the droplet size. However, the presence of dyes that absorb UV and visible radiation in the mixture prior to curing can lead to incomplete or the complete prevention of successful curing. Furthermore, the dyes may decompose upon curing.

Another technique used for obtaining PDLC composites is thermal induced phase separation (TIPS). This technique can be used for liquid crystal materials and thermoplastic materials which are capable of forming a homogenous solution above the melt temperature of the polymer. The homogenous solution of liquid, crystal in the thermoplastic melt is cooled below the melting point of the thermoplastic material, thereby causing a phase separation of the liquid crystal. The droplet size of the liquid crystal is determined by the rate of cooling and a number of other material parameters. Examples of TIPS-prepared composites are polymethylmethacrylate (PMMA) and polyvinylformal (PVF) with cyanobiphenyl liquid crystal. Generally, the concentrations of liquid crystals required for TIPS-film are larger in comparison to PIPS-prepared films.

Another technique used to prepare polymer dispersed liquid crystal composites is solvent-induced phase separation (SIPS). This makes use of a liquid crystal and a thermoplastic material dissolved in a common solvent thereby forming a homogenous solution. The ensuing evaporation of the solvent results in phase separation of the liquid crystal, droplet formation and growth, and polymer gelation. Solvent evaporation can also be used in conjunction with thermal processing of materials which melt below their decomposition temperature. First of all films are formed on a suitable substrate using standard film coating techniques, e. g. doctor blading, spin coating, web coating, etc. The solvent is thereafter removed with no concern of droplets size or density. Then the film is warmed again to re-dissolve the liquid crystal in the polymer and then cooled at a rate which is chosen to give the desired droplet size and density. In effect, the latter example is a combination of SIPS with TIPS.

A common problem encountered with all of these aforementioned techniques is the fact that the phase-separation achieved is only incomplete, i. e. some of the liquid crystal plasticizes the polymer network formed, because it stays co-dissolved within the polymer. This is disadvantageous for any electronic device making use of such liquid crystal.

Electronic device display technologies require displays with high brightness and contrast, low power consumption, and fast refresh speeds. For flexible displays, polymer thin film technology is being explored and in particular, polymer dispersed liquid crystal films (=PDLC) are of interest. In these materials it is important to achieve good phase separation of the components with minimal co-dissolution. Such co-dissolution reduces the scattering-switching contrast between "on" and "off" states. Furthermore, if coloured dyes are used to produce coloured PDLC films, dissolution of the dye into the inactive polymer matrix reduces colour-switching contrast. An additional impediment is that in the preferred curing method, that of ultra-violet light photo curing, many coloured dyes undergo photodegradation. There are other advantages which would make it appear desirable to add dyes to PDLC composite films. Addition of dipolar dyes can, for example lead to faster "turn-on" times.

Another problem commonly encountered with PDLC composites is the fact that additional components dissolved in the liquid crystal are sensitive to the phase separation process and frequently are damaged in the course of the polymerization and/or the formation of the polymer matrix. For example it is very difficult to include UV-sensitive dyes which survive photo-induced polymerization. Accordingly it has been a problem to produce PDLC-composites which are coloured by the inclusion of dyes.

In the priority application to the present application, which is hereby incorporated by reference in its entirety (Priority Application No. EP 01129709.0, filed on Dec. 13, 2001), the problem of co-dissolution of the liquid crystal component within the polymer matrix has been solved by a method whereby in an initial state a co-dispersion of liquid crystal and a prepolymer is made, followed by curing and removal of the liquid crystal. The subsequent refilling of the voids created during the polymerization with another liquid crystal material leads to a polymer dispersed liquid crystal (PDLC) material having a markedly improved absorption and reduced turn-off-times with respect to hitherto to known PDLC-materials. The subsequent re-filling of the voids created during the polymerization may be by a liquid crystal material which is the same or different to the material initially involved in the co-dispersion.

Neither with this technique, however, nor with the technique originally employed by Craighead has it been possible to include dyes in the liquid crystal material that forms part of the composite, and thereby create a composite that can for example be used in a display cell that is capable of reversibly switching between a coloured state and a transparent state. Neither the devices prepared according to Craighead's technique (i.e. addition of a non-absorbing liquid crystal material to a preformed polymer matrix) nor the devices prepared according to the technique as described in the priority application to this application (Priority Application No. EP 01129709.0, filed on Dec. 3, 2001) were capable of reversibly switching between two different states, i.e. a coloured state and a transparent state if the liquid crystal material included a dye, for example a dichroic dye.

Accordingly it has been an object of the present invention to allow for the preparation of a composite that can be used in a display cell which is then capable of reversibly switching between a coloured and a transparent state.

This object is solved by a method of forming a composite containing a matrix component and at least one liquid crystal component, said at least one liquid crystal component being dispersed within said matrix, said matrix component having a first index of refraction and said at least one liquid crystal component having a second index of refraction, the difference between the first and the second indices of refraction being variable over a range of values, such that it is possible to adjust the difference between the first and the second index to be small or approximately zero, whereby, as a result, a display cell containing said composite becomes transparent, said method comprising the following steps:

a) providing a matrix component,
b) providing at least one liquid crystal component, said liquid crystal component being optically absorbing,
c) adding the at least one liquid crystal component to the matrix component.

Preferably, the method according to the present invention comprises the additional step:

d) heating the composite containing the matrix component and at least one liquid crystal component to a temperature above the isotropic temperature of the liquid crystal component, but below the decomposition temperature/melting temperature of the matrix component, and, even more preferably, comprises the additional step:

e) cooling the composite to room temperature.

It is preferred that the heating occurs for 1-20 minutes, preferably 1-10 minutes, more preferably 1-5 minutes, and the cooling occurs over a period of 1-60 minutes, preferably 1-40 minutes, more preferably 5-20 minutes.

In one embodiment the at least one liquid crystal component contains at least one optically absorbing component, wherein, preferably, the at least one optically absorbing component is soluble in the at least one liquid crystal component.

It is preferred that the soluble optically absorbing component is selected from the group comprising dyes, compounds with permanent, dipoles, rod-like structure materials, and nanotubes, wherein, preferably, the soluble optically absorbing component is selected from the group comprising UV-sensitive dyes, U-stable dyes, cis-trans isomer dyes, dicroic dyes and dipolar dyes.

In one embodiment the matrix component is a polymer-matrix-component or a glass-based component or a combination of the two (i.e. polymer-glass-hybrid materials) wherein, preferably, the polymer-matrix component is a preformed porous polymer matrix or is a polymer matrix, prepared by the PDLC-technique (polymer-dispersed liquid crystal-technique).

The objects of the present invention are also solved by a composite obtainable by a method according to the present invention.

Preferably, the composite contains a liquid crystal component doped with a compound selected from the group comprising dyes, UV-sensitive dyes, V-stable dyes, dicroic dyes, dyes with a permanent dipole, rod-like structure material and nanotubes.

The objects of the present invention are also solved by a device containing a composite according to the present invention.

The objects of the present invention are also solved by a use of a device according to the present invention, or of a composite according to the present invention in a display, a smart window, a membrane, an optical valve, a Bragg grating, an optically sensitive memory, an infrared shutter, a gasflow sensor, a pressure sensor and/or a polarizer.

In the case that the matrix component is a polymer-matrix, it is preferred that the matrix is porous.

The term "porous" as used herein is meant to signify that the matrix provides an interstitial space wherein other matter can be taken up, e.g. liquids. Preferred embodiments of a matrix according to the present invention are sponges, filters, filter papers, gels, networks, sieves, polymer gels, polymer sieves.

Further examples of the matrix are inorganic networks, e.g. silica networks, which can for example be produced by a sol-gel process, or xerogels. The latter term applies to any very low-density network where there is a continuous void phase and where there is a solid phase that is either of an organic or inorganic material.

In a preferred embodiment the interstitial space has dimensions in the x, y, z-directions taken from the range 100 nm-30 μm, more preferably 500 nm-10 μm and even more preferably 600 nm-5 μm. Most preferably the interstitial space's dimensions (pore size) are centered around 3 μm.

The idea of these dimensions is, that, although this is not absolutely essential to the invention, scattering of electromagnetic radiation shall be achieved by appropriate choice of dimensions. Without wishing to be bound by any particular theory, the inventors have found that by choosing the aforementioned dimensions, scattering can be achieved and thereby the absorption of electromagnetic radiation through dyes, possibly included in the liquid crystalline phase, can be enhanced, because the pathlength of light has been increased. Preferably, when scattering is desired, the maximum refractive index difference between the matrix and the liquid crystal material is >0.01, in order to achieve scattering.

In the practice of the invention useful liquid crystal materials are manifold, and a wide variety can be commercially obtained from various sources. For example the company Merck offers a wide range of liquid crystal materials. Although by no means limited thereto, useful examples in the practice of the present invention include liquid crystal compounds selected from the group comprising cyanobiphenyls and substituted cyanobiphenyls. The liquid crystal material referred to as "E7" which is a mixture of various proportions of different cyanobiphenyls is particularly useful; the choice of liquid crystal material, of course, depends on the intended application and purpose. Other useful liquid crystal materials available from Merck are TL213, TL203 and 5CB.

In the practice of the present invention useful dyes may have additional groups which alter the colouring effect of the dye. These groups may be auxochrome groups, which alter the absorption spectral properties of the dye, such as $NR_2$, OR, COOH, $SO_3H$, CN. Examples of UV-sensitive dyes are dyes with azo-groups, or dyes which additionally have a permanent dipole moment like MORPIP.

The term "PDLC-technique" as used herein is meant to signify both the PDLC-technique as claimed and described in the claims of priority application to this application (priority application No. EP 01 129 709.0) (therein also referred to as "DPDLC" (dispersed DPDLC) and "SPDLC" (sponge-like PDLC)) as well as the techniques known from the prior art to that priority application and described in the specification of EP 01 129 709.0 on pages 1-3 of the specification.

As used herein if a liquid crystal component is referred to as "optically absorbing" it can mean that the liquid crystal component is intrinsically optically absorbing (due to its own chemical structure), or it has absorbing properties due to other substances being present in the liquid crystal component, e.g. solutes, such as dyes.

It has been surprisingly found that by the present invention it is possible to include a dye into the liquid crystal and make full use of the characteristics provided by this dye. Simply by including an additional heating step above the isotropic temperature of the liquid crystal material containing the optically absorbing compound, it was possible to achieve a composite that can be reversibly switched between a coloured and a transparent state. It is clear that someone skilled in the art will be able to determine the respective temperature to which such heating must occur, without undue experimentation. The selection of appropriate temperature simply depends on the type of liquid crystal material and the type of optically absorbing dye (e.g. UV-sensitive dye, dichroic dye etc.) used. This allows for applications with a higher colour contrast, and enables the incorporation of dyes and liquid crystal molecules, normally sensitive to UV light. Another additional advantage is that the composite according to the present invention has a faster switch-off time thus allowing for faster refresh rates in display devices comprising the material.

The invention allows also for example the preparation of a PDLC prepared by photo curing of a liquid crystal/prepolymer composite, where dyes of any type compatible with the liquid crystal phase can be incorporated, regardless of their photosensitivity to ultra-violet light. Furthermore, this material type shows an improvement in the "turn-off" time. Amongst other aspects, the invention therefore provides for an improved PDLC material more suited to colour display applications.

In the following detailed description reference is made to the figures, wherein

Figure 2:
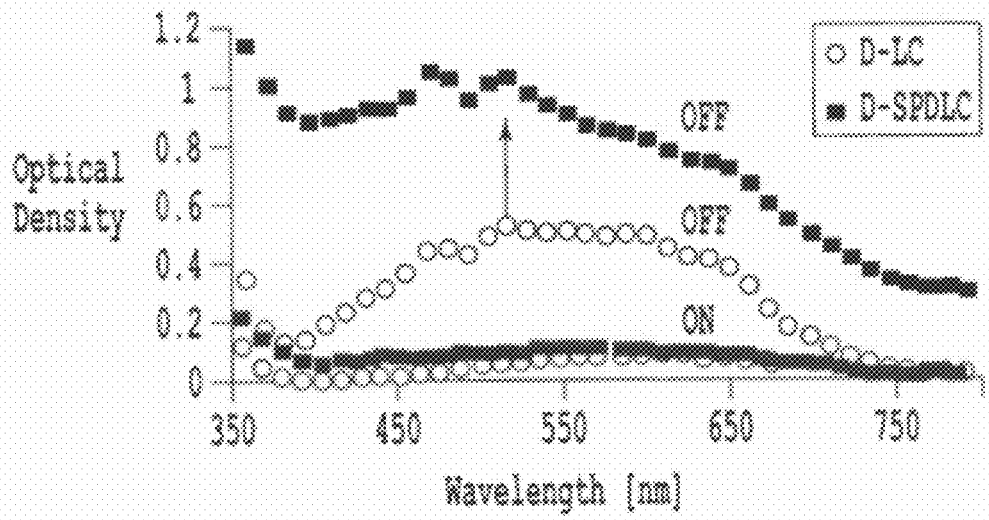

FIG. 1 shows the washing out of the PDLC-component, including any lc-material contained as a solute in the solid polymer phase, by means of acetone, FIG. 2 shows that the contrast ratio of the dye doped sponge-like PDLC (D-SPDLC) was improved by almost twice compared to the conventional dye doped liquid crystal (D-LC).

Figure 3:
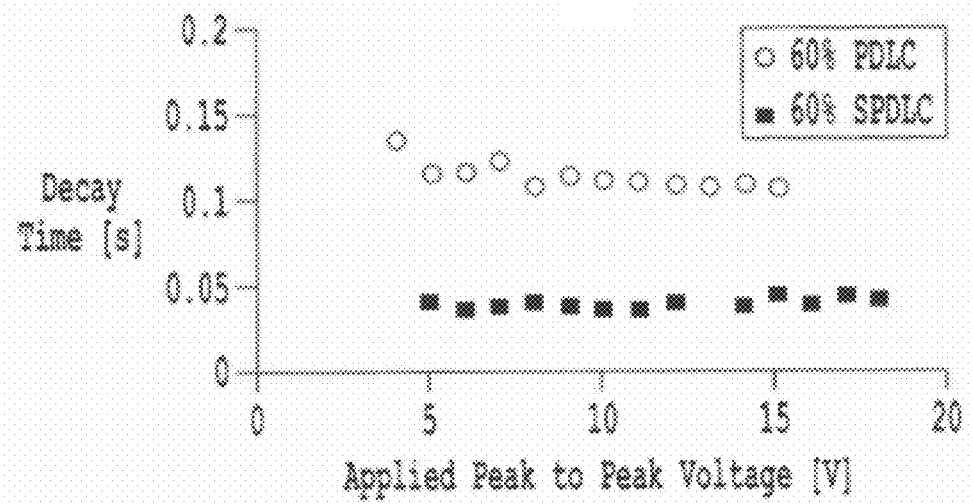
Figure 4:
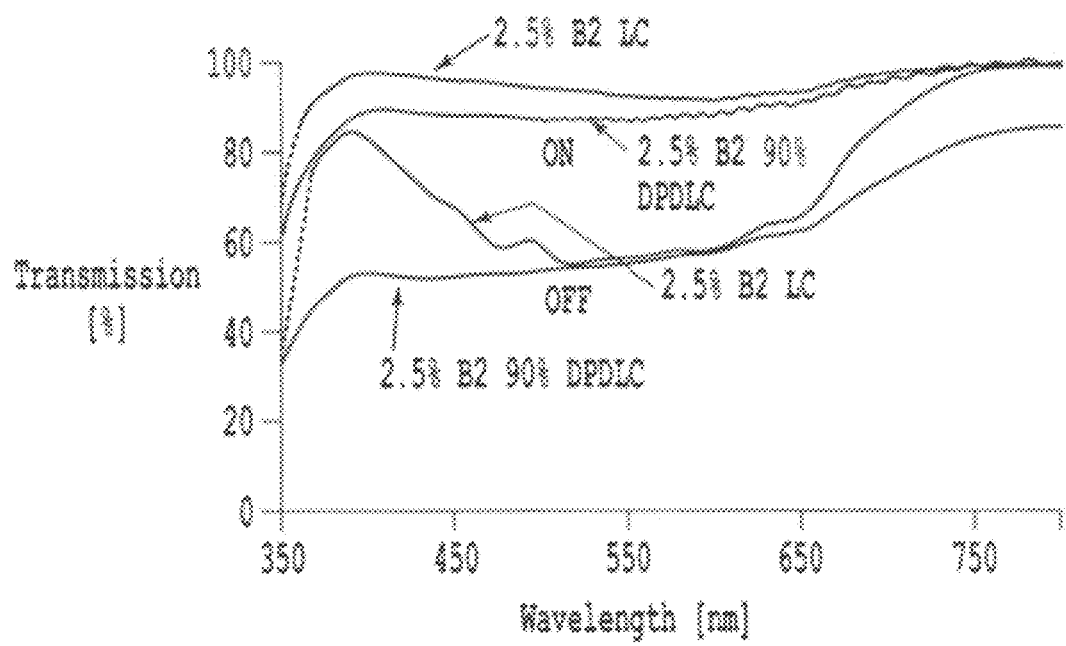
Figure 5:
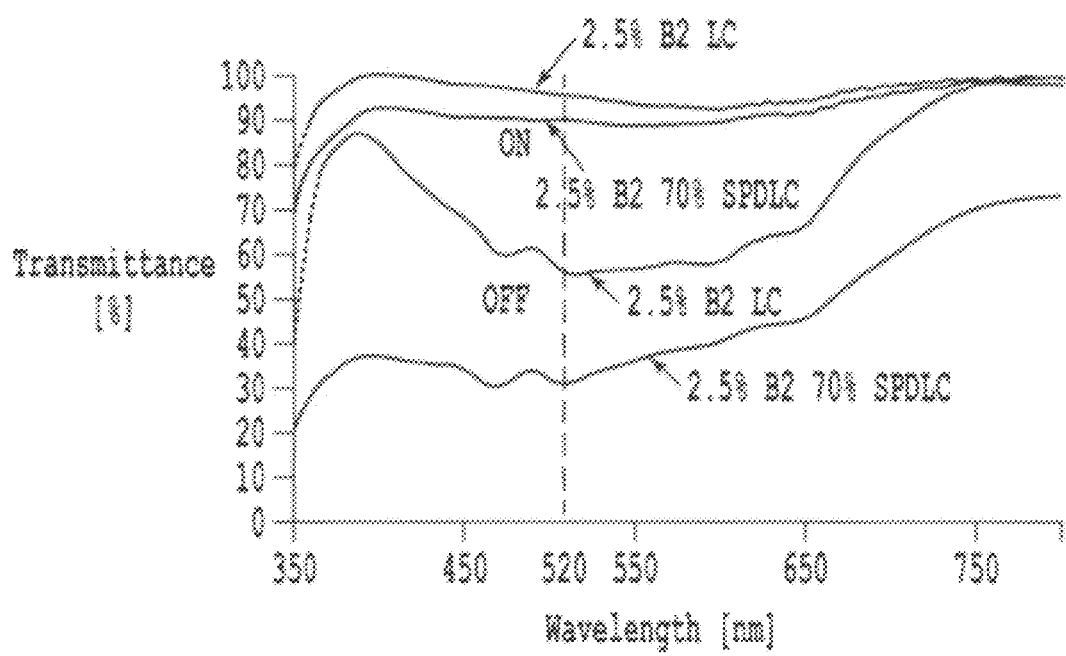
Figure 6:
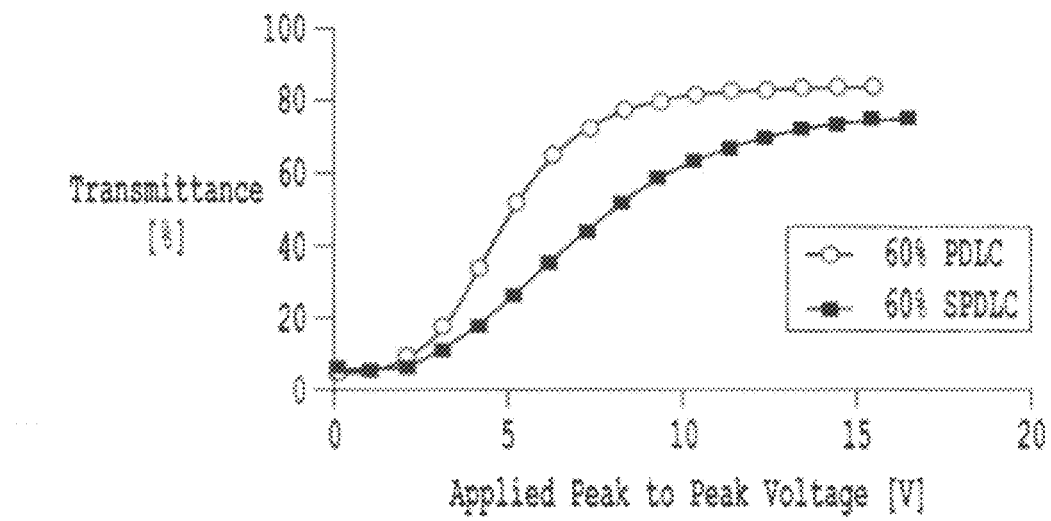
Figure 7:
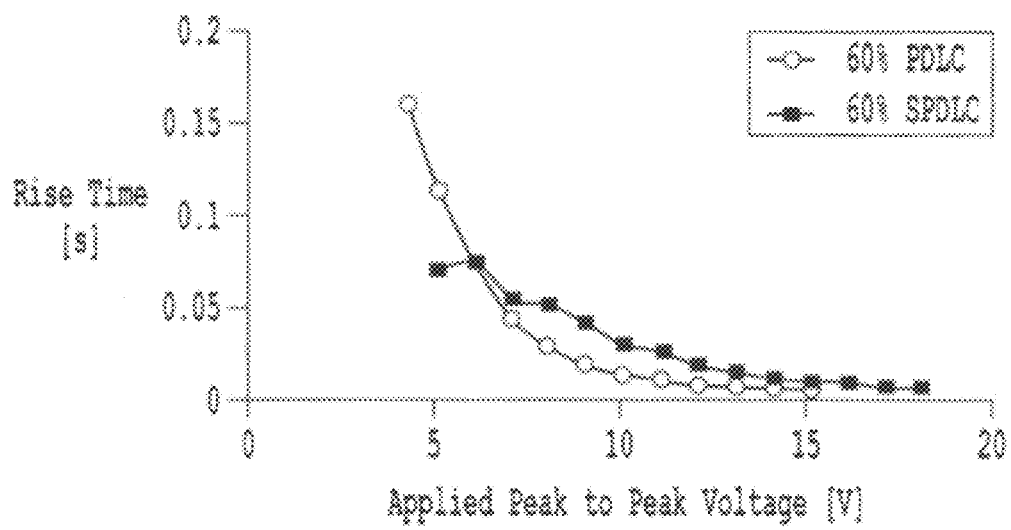
Figure 8:
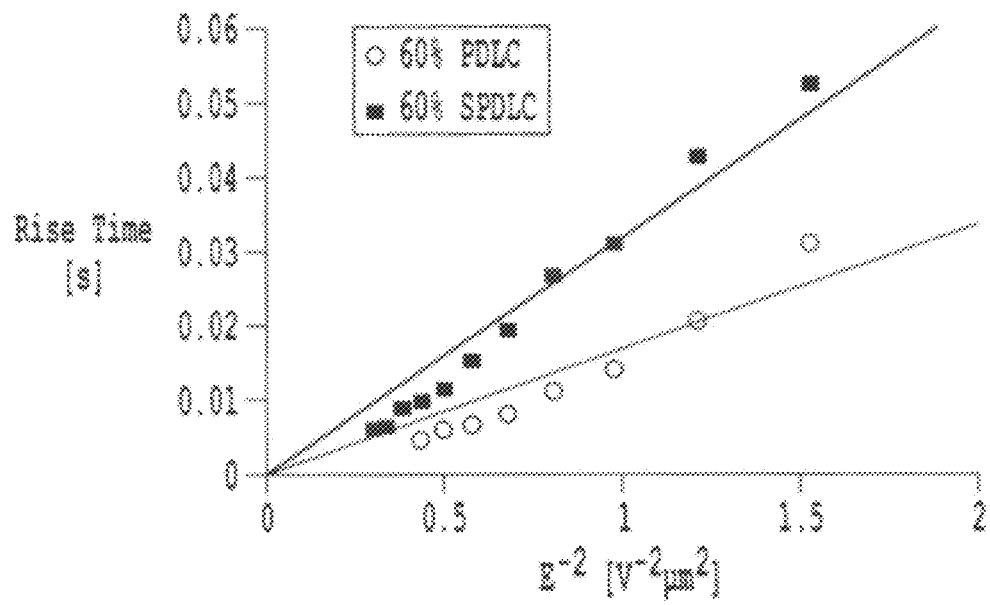
Figure 9:
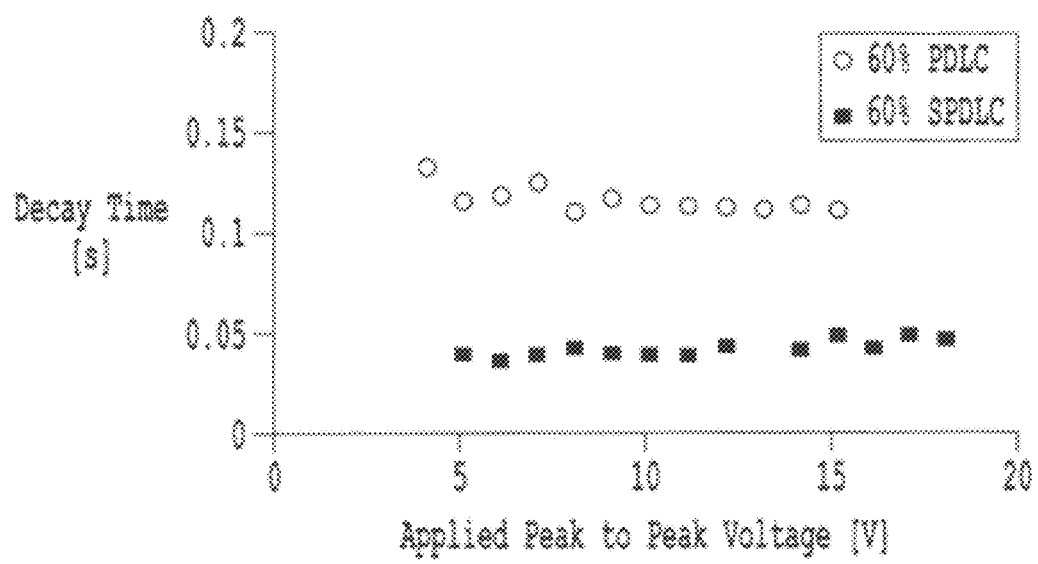
Figure 10:
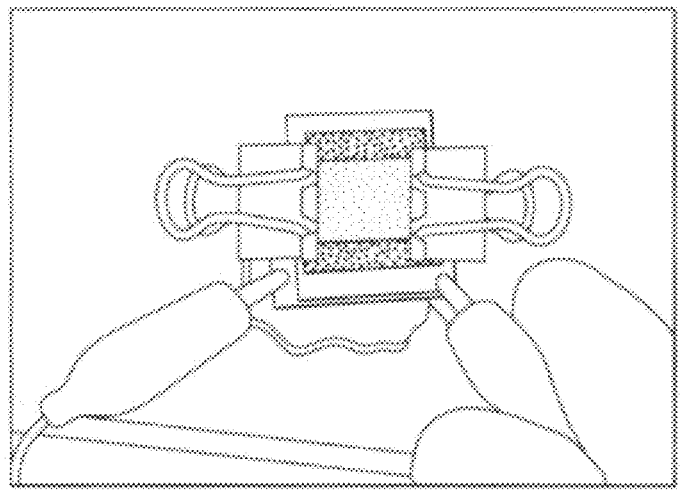
Figure 11:
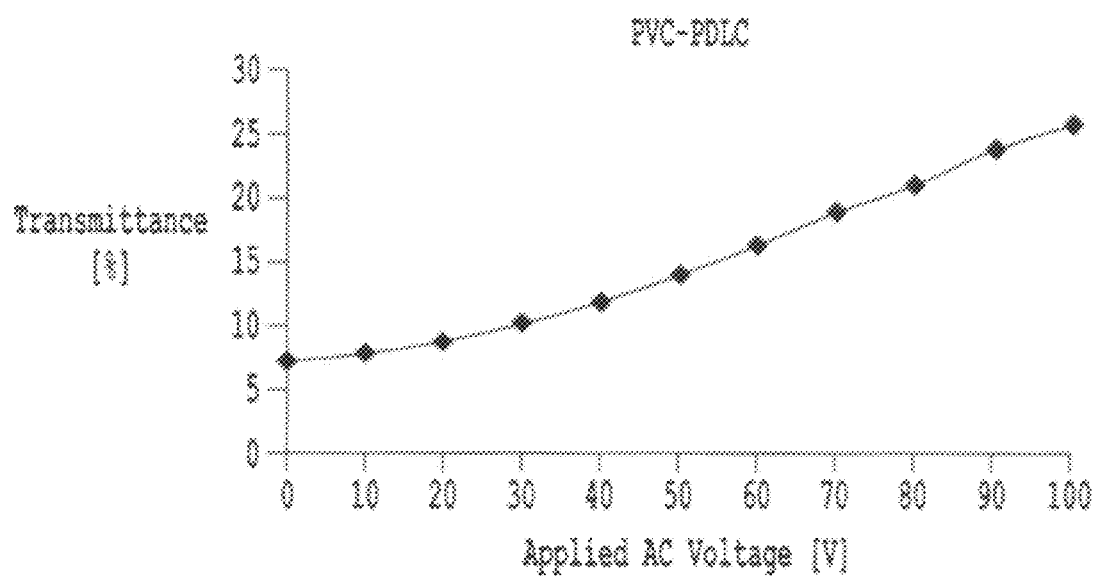

FIG. 3 shows the comparison for the switching times for a PDLC film prepared by a conventional method without dye (PDLC) and for a comparable material of the inventive subject (SPDLC). Over a range of applied voltages, the reduction in switch-off time is approximately a factor of three, FIG. 4 shows a comparison of transmittance between a Dispersed PDLC (2.5% B2 90% DPDLC) with a Heilmeier liquid crystal (2.5% B2 LC) doped to the same concentration of dye, FIG. 5 shows a comparison of transmittance between a Sponge PDLC (2.5% B2 70% SPDLC) with a Heilmeier liquid crystal (2.5% B2 LC), FIG. 6 shows a transmittance measurement of undoped PDLC and undoped SPDLC vs. Ap plied Peak to Peak Voltage, FIG. 7 shows Rise Time Measurement of undoped PDLC and undoped SPDLC, FIG. 8 shows Rise Time Variation with inverse electric field square for PDLC and SPDLC, FIG. 9 shows Decay Time of undoped PDLC and undoped SPDLC, FIG. 10 shows a polymer matrix filled with a dye-doped liquid crystal, and FIG. 11 shows a transmittance/voltage response of the polymer matrix of FIG. 10.

The following examples are intended to describe the invention more specifically by way of example and are not intended to limit the scope or spirit of the invention.

EXAMPLE 1

In one embodiment of the present invention, a dye-doped liquid crystal component of the PDLC is incorporated after the photo curing stage has been completed. The first stage in the preparation of the PDLC is that of the formation of the voids within which the dye-doped liquid crystal will reside. This is achieved by curing a homogeneous mixture of un-doped liquid crystal and liquid prepolymer. As an example, a 60% by weight mixture of E7 liquid crystal and NOA65 (Norland Optical Adhesive Inc.) liquid prepolymer may be cured using UV light to give an initial PDLC medium with well controlled LC droplet size and distribution. Following curing, the LC component, including any LC material contained as a solute in the solid polymer phase, is Washed out using, for example, acetone (FIG. 1).

The voids remaining are then re-filled using dye-doped liquid crystal, forming a dye-doped sponge-like PDLC (S-PDLC). In a preferred example, the dye is a highly dipolar dye used for colouration of the PDLC and as a means to obtain faster "turn-on" time. Morpip is one such dye example.

The resulting PDLC material regardless of dye content exhibits a marked improvement in optical density (FIG. 2) and reduction in the "switch-off" time due to increased anchoring by the matrix walls (FIG. 3).

Typical values obtained according to the present invention (PDLC+2.5% B2) can be compared with a conventional Heilmeier liquid crystal (LC+2.5% B2) in the following table.

TABLE

|  | Absorption$_{ON}$ | Absorption$_{OFF}$ | contrast ratio A$_{OFF}$/A$_{ON}$ |
|---|---|---|---|
| PDLC + 2.5% B2 | 0.08 | 0.99 | 12.4 |
| LC + 2.5% B2 | 0.07 | 0.52 | 7.4 |

Conventional PDLCs

Sample Fabrication

First a polymer-LC mixture was prepared by mixing an equal volume of the UV curable polymer, NOA65, and a doped liquid crystal E7. The mixture was stirred using Teflon coating magnetic stirrer for at least one hour in dark. A 10 µm empty glass cell with no alignment layer (KSSZ-10/B111PINTS from E.H.C. Co., Ltd., Japan). was filled with the solution at 70° C. Immediately after filling, the cell was cooled to the room temperature of 21° C., the cell was irradiated by means of UV light (360 nm, Spectroline, Model EN-180L/F, 230 V, 50 Hz, 0.17 A) at an intensity of 4.8 mW/cm$^2$.

This UV curing process initiates cross-linking of the polymer, making liquid crystal insoluble in the polymer. The phase separated liquid crystal forms droplets, they merge and grow bigger until the polymerization of the matrix has progressed sufficiently to lock their morphology. This curing process could be observed unter a cross-polarised microscope. It is known that as the UV initiates cross-linking of polymers chains, the liquid crystal phase separates from them and merges to form bigger droplets. The size of the droplets can be controlled by the speed of the curing process which can be controlled by the intensity of the UV irradiation.

PDLCs with different morphologies of the droplet type could be made by varying E7-NOA65 composition and curing conditions. When the liquid crystal volume proportion to the polymer was 80 vol % (80% PDLC), the liquid crystal droplets were no, longer spherical in shapes but deformed. When the liquid crystal proportion was increased to 90%, the enclosure of liquid crystal in polymer matrix disappeared, and the network of polymer was formed in liquid crystal matrix. When the 90% PDLC is cured faster, the phase separated polymer does not have enough time to form networks, and the polymer droplets are formed. These latter two types of PDLC are known as network type PDLC and polymer ball type PDLC.

EXAMPLE 3

Novel PDLCs

To overcome the low contrast problem due to dye deterioration and dye trapping, two new dichroic PDLC fabrication techniques were proposed. For convenience, the PDLCs made by the first method were named Dispersed PDLC (DP-DLC), and the second ones were named Sponge PDLC (SP-DLC). Their fabrication and properties are described below.

a) Dispersed PDLC

The first method involves forcing doped liquid crystal "in", and consequently pushing undoped liquid crystal "out" from a ready-made PDLC cell. This method may be applied only when the liquid crystal phase in the PDLC is interconnected. For the liquid crystal-polymer combination used in this work, the liquid crystal proportion in the PDLC must be more than 80% to achieve the continuous liquid crystal phase.

It turned out that in many instances there were polymer balls in the nematic liquid crystal. The refilling process did not sweep the polymer balls out from the cell, therefore they were probably attached to either side of the substrates. In these cases, the cell was made by curing 90% PDLC for 2 minutes with the UV source placed 10 cm away from the cell.

Further, the transmittance of the DPDLC was compared with a Heilmeier liquid crystal doped to same concentration of dye to see how scattering has improved the absorption of the dye. The result which can be seen in FIG. 4 showed a transmission decrease at 800 nm, which indicates that more scattering was present in DPDLC compared to Heilmeier liquid crystal. Even though the DPDLC has 10% less dyes present compared to the Heilmeier liquid crystal, the transmission at 550 nm stays the same (54%), implying the increase in dye absorption due to scattering. Unfortunately, the DPDLC contrast was 1.63 (T$_{ON}$/T$_{OFF}$=88%/54%) at 530 nm, which was still to weak for display applications that requires at least a contrast of 2.7. It was not possible to increase the contrast much more by using the same liquid crystal (E7). and polymer (NOA65) combination, as the mixture starts forming droplets under 80% PDLC. The network type PDLC or polymer ball type PDLC, which has continuous liquid crystal, with very high scattering would further improve the contrast using the dispersion method.

b) Sponge PDLC

This second new fabrication technique, which gives an increased contrast compared to DPDLC introduced in the previous section, makes use of the fact that E7 liquid crystal is highly soluble in acetone, while NOA65 polymer is only slightly soluble. When a ready-made undoped PDLC cell was soaked in acetone, E7 liquid crystal and uncured monomer and oligomer in the PDLC cell slowly dissolve in the solution.

The cell became less scattering when E7 mixes with acetone, but it became weakly scattering again as the E7 is fully washed out. The duration of this process depends on the size and proportion of liquid crystal droplets. When the droplet sizes are in order of 1 µm, and the liquid crystal proportion is 50%, the washing process takes a few weeks. If the droplet sizes are in order of 100 µm, and the liquid crystal proportion is 90%, i.e. all the liquid crystal is connected together, the process takes only a few days.

After fully removing the E7, slow heating in the drying cabinet evaporated the acetone in the remaining acetone-polymer system. A sponge of polymer matrix with air cavities remained. Observation of the polymer sponge under a microscope did not show any noticeable difference in the matrix structure.

Then the cell was stood upright in a small beaker filled with desired dye doped liquid crystal, leaving one open-end of the cell not soaked in the liquid crystal. Then the beaker was quickly placed in a vacuum oven at 40° C. This refilling method in vacuum avoids any air left in the matrix after filled by doped liquid crystal. Finally, when the cell is refilled, it was taken out of the beaker, and both open-ends of the cell were sealed with epoxy.

EXAMPLE 4

Contrast Measurement

Off-state transmittance of doped SPDLC and a conventional Heilmeier liquid crystal cells were compared to investigate the contrast improvement which could not be observed with doped PDLC. Both cells contained 2.5 wt % B2 in the liquid crystal. The liquid crystal proportion to polymer in SPDLC was 70%. B2 is a mixture of azo and anthraquinone dyes commercially available from Mitsubishi Chemical in Japan.

The result in FIG. 5 shows that the Heilmeier liquid crystal transmittance of 55% was decreased to 30% less liquid crystal, and hence 30% less dyes. At 520 nm, doped SPDLC achieved a contrast of 3.0 compared to 1.7 for the Heilmeier liquid crystal. The decrease in transmittance was clearly achieved by the scattering effect, as can be observed by the decrease of transmittance at 800 nm where there is no absorption by the dye. The effect of the scattering can be seen by a further decrease in the SPDLC transmittance at 400 nm. This is because the scattering efficiency decreases rapidly with increasing wavelength.

EXAMPLE 5

Threshold Characteristic of SPDLC

Following the successful contrast result from the previous example the SPDLCs were investigated further by comparing the electro-optic properties of undoped SPDLC with undoped PDLC. Two identical undoped PDLC cells were made under the same conditions. The liquid crystal proportion of the PDLC's was 60%, and the cells were irradiated with UV from 10 cm away for 2 minutes. Both cells were 10 μm thick without any prior alignment treatment. Then one of these cells was converted to an undoped SPDLC sample by the following method. The E7 was simply washed away and the polymer sponge was filled with undoped pure E7 liquid crystal. Transmittance variation with applied voltage was measured and the result shown in FIG. 6 was obtained.

The result shows that the $V_{10}$ is 2.5±0.3 V for PDLC, and 3.5±0.3 V for SPDLC. $V_{90}$ for PDLC is 7.5±0.3 V and 12±0.3 V for SPDLC. Both $V_{10}$ and $V_{90}$ were increased by approximately 34% by transforming the PDLC into SPDLC. The increase indicates increase in anchoring energy at the polymer walls, caused by the removal of the uncured monomer and oligomer or drying, or combination of both.

The values for $T_{max}$, $T_{min}$, $V_{10}$, $V_{90}$, $V_{sat}$ are dependent on the sample and the cure conditions and vary from 0~100% ($T_{max}$, $T_{min}$), and from 0~>100 V ($V_{10}$, $V_{90}$, $V_{sat}$).

Typical values obtained according to the present invention are $T_{max}$ 80~100%, $T_{min}$ 0~30%, $V_{10}$ 0~5V, $V_{90}$ 5~20V; these values can, for example, be obtained from a composite comprising 60% E7 and 40% NOA65, where the thickness is 10 micron.

EXAMPLE 6

Response Time Measurement

To further characterize the SPDCL, the response times of undoped PDLC and undoped SPDLC were measured using the same set-up used in the previous example. All cells tested were 10 μm thick without any surface alignment. Rise and decay time results are shown in FIG. 7 and FIG. 9 respectively.

The inconsistent variation at lower voltage, under 8V, was due to the liquid crystal not reaching full alignment. Nevertheless, the trend of undoped SPDLC responding slower to the electric field compared to undoped PDLC can be seen when higher voltages are applied. This difference shown more clearly when the rise time variation with inverse square of the electric field is plotted as shown in FIG. 8. Assuming that the PDLC behaves to electric field as liquid crystal does, a straight line through the origin was fitted to the data points, and the gradient calculated. The gradients of the PDLC and SPDLC samples were 0.016±0.002 sV$^2$ μm$^{-2}$ and 0.031±0.002 sV$^2$ μm$^{-2}$ respectively. Even though the lines were not fit perfectly, the difference in gradients clearly indicates that the SPDLC is approximately twice as slow as the PDLC. Nevertheless, they are both within the targeted range of 100 Ms under an applied filed of 10 Vm.

The same PDLC and SPDLC cells were used to measure decay time, and the result is shown in FIG. 9. Surprisingly, the decay time of the SPDLC cell is only 73% of the decay time obtained for the PDLC cell. The SPDLC cell switches off as fast as it switches on, and this can be useful since the slow decay time of liquid crystals is one of the problems suffered by liquid crystal displays. The measured decay time for 10 μm Heilmeier liquid crystal was 250 ms, which is considerably longer than the 30 ms for SPDLC.

Increases in the rise time and decreases in the decay time, together with the increased threshold voltage measurement from the previous section, are common effects observed when the anchoring energy of the polymer wall is increased. Further measurements of anchoring energy would reveal the effect.

EXAMPLE 7

A black and white display test cell was made by adding a dichroic dye-doped liquid crystal (=D-LC) to a preformed polymer membrane filter. In the following this is referred to as dichroic filter-PDLC (D-FPDLC). The basic idea of adding a D-LC to a polymer matrix is the same as that of a dye-doped sponge-like dispersed liquid crystal (=D-SPDLC). The initial polymer matrix does not have to be made by fabricating a PDLC as in the priority application EP 01129709.0, but any pre-formed porous matrix (such as glass, polymer or gel) can be used as well to fabricate a colour display.

The materials used are a liquid crystal material (LC), a dichroic dye and a polymer filter. The LC used in this example is BL001 (formerly known as E7) available from Merck. The reason for choosing this LC is because the refractive index of the LC (1.522) matches that of the filter (approximately 1.5). Also the LC switches at low voltage which is important for such thick filter. The filter used is from Millipore (www.millipore.com. CAT NO. Polyvinyl Chloride (PVC) PVC504700. Filter Type 5.0 μm). The thickness of the filter is approximately 100 μm. The dye Black-2 used is a mixture of azo and anthraquinone dyes available from Mitsubishi Chemical in Japan.

The fabrication of such test cell is simple, and this is the best advantage for using such display mode. The D-LC mixture was first made by adding 1 wt % Black-2 in BL001 LC, and stirring overnight. A cell was made by sandwiching a sheet of filter with a pair of indium-tin-oxide (ITO) coated glass substrates. Then the cell was filled with the D-LC by capillary action in vacuum. Finally the D-FPDLC was heated above the LC's isotropic temperature (61° C.) and cooled. The temperature did not exceed the glass transition temperature (Tg) of the PVC which is expected to be 80° C. Omission of the heating step leads to the D-FPDLC not being able of switching, whereas heating after the filling of the filter leads to a reversible switchability. The refractive indices of the liquid crystal (in this case: E7 (n=1.52)) should match that of the matrix (in this case: PVC). Also, when the filter+E7 cell was heated above the $T_{NI}$ (nematic to isotropic temperature) (i.e. the temperature for the transition: nematic to isotropic) of E7, the cell became transparent, which is also showing the refractive indices match of the two compounds.

FIG. 10 shows the PVC filter filled with 1% B2 BL001. The middle grey square is where the ITO overlaps and hence the electric field is applied. The darker area around the small square is where there is no electric field. A piece of white paper was placed on the back of the test cell to make the middle grey square more visible.

FIG. 11 shows the transmittance-voltage response of the D-FPDLC of this example. The test cell could not be fully turned on at 100V. Due to experimental set-up, 100V was the maximum voltage possible to generate. This is due to the thick PVC filter and also probably due to inhomogeneous pore sizes in the filter. When the filter pores are unnecessarily small (e.g. under 1 μm), the voltage required to turn the cell on increases.

Further optimization is possible without undue need for experimentation. For example, thinner, more homogeneous filters should be used, which will result in the cell being able to give high transmittance switched at low voltage. Furthermore increasing the temperature of the test cell to 40-50° C. gives higher transmittance at 100V, which probably is because the viscosity of the LC is reduced by the higher temperature, hence reducing the voltage required to switch on the LC test cell.

The great advantage of using a sponge like polymer dispersed lispersed liquid crystal (SPDLC) in the method according to the present invention is that the parameters of the polymer matrix can be precisely tuned. However, if a pre-formed filter is used instead as a matrix in the method according to the present invention, this greatly simplifies the manufacturing process.

It is important therefore to note that the method according to the present invention is not limited to any specific way in which the matrix is formed, wherein the dye-doped liquid crystal material is dispersed. It can be applied to any matrix, be it preformed or a PDLC, that forms during the making of the composite.

The features disclosed in the specification, the claims and the drawings may, alone or in any combination thereof, be essential in the practice of the present invention.

The invention claimed is:

1. A method of forming a composite containing a matrix component and at least one liquid crystal component, said at least one liquid crystal component being dispersed within said matrix, said matrix component having a first index of refraction and said at least one liquid crystal component having a second index of refraction, the difference between the first and the second index of refraction being variable over a range of values, such that it is possible to adjust the difference between the first and the second index to be small or approximately zero, whereby, as a result, a display cell containing said composite becomes transparent, said method comprising:

providing a porous matrix having an interstitial space for taking up liquids, wherein pores in the porous matrix have a pore size in the range of 500 nm to 10 μm;

providing at least one liquid crystal component, said at least one liquid crystal component being optically absorbing;

adding the at least one liquid crystal component to the porous matrix;

heating the composite containing the porous matrix and at least one liquid crystal component to a temperature above the isotropic temperature of the at least one liquid crystal component, but below the decomposition/melting temperature of the porous matrix; and cooling the composite to a first temperature, wherein the composite, while at the first temperature, can be reversibly switched between a colored state and transparent state by applying an electric field directly to the composite.

2. The method according to claim 1, wherein the heating occurs for 1-20 minutes, and the cooling occurs over a period of 1-60 minutes.

3. The method according to claim 1 wherein the at least one optically absorbing component is soluble in the at least one liquid crystal component.

4. The method according to claim 3, wherein the soluble optically absorbing component is selected from the group comprising dyes, compounds with permanent dipoles, rod-like structure materials, and nanotubes.

5. The method according to claim 4, wherein the soluble optically absorbing component is selected from the group comprising UV-sensitive dyes, UV-stable dyes, cis-trans isomer dyes, dichroic dyes and dipolar dyes.

6. The method according to claim 1, wherein the porous matrix component is a pre-formed porous polymer matrix or is a polymer matrix, prepared by the PDLC-technique (polymer-dispersed liquid crystal-technique).

* * * * *